United States Patent
Pedersen

(10) Patent No.: US 7,569,945 B2
(45) Date of Patent: Aug. 4, 2009

(54) METHOD AND CONTROL SYSTEM FOR REDUCING THE FATIGUE LOADS IN THE COMPONENTS OF A WIND TURBINE SUBJECTED TO ASYMMETRICAL LOADING OF THE ROTOR PLANE

(75) Inventor: Bo Juul Pedersen, Hadsten (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/210,730

(22) Filed: Sep. 15, 2008

(65) Prior Publication Data

US 2009/0021015 A1    Jan. 22, 2009

Related U.S. Application Data

(63) Continuation of application No. PCT/DK2006/000153, filed on Mar. 16, 2006.

(51) Int. Cl.
*H02P 9/04* (2006.01)
*F03D 9/00* (2006.01)
(52) U.S. Cl. ........................................... 290/44
(58) Field of Classification Search .................... 290/44
See application file for complete search history.

(56) References Cited

U.S. PATENT DOCUMENTS

| | | | | |
|---|---|---|---|---|
| 4,161,658 | A | | 7/1979 | Patrick ........................ 290/44 |
| 4,348,155 | A | * | 9/1982 | Barnes et al. .................. 416/46 |
| 4,584,486 | A | * | 4/1986 | Quynn ........................ 290/44 |
| 5,584,655 | A | * | 12/1996 | Deering ...................... 416/31 |
| 5,660,527 | A | * | 8/1997 | Deering et al. .............. 416/205 |
| 6,888,262 | B2 | * | 5/2005 | Blakemore .................... 290/44 |
| 7,071,578 | B1 | * | 7/2006 | Shibata et al. ................ 290/55 |
| 7,153,090 | B2 | * | 12/2006 | DeLeonardo et al. ........ 415/4.2 |
| 7,342,323 | B2 | * | 3/2008 | Avagliano et al. ............. 290/55 |
| 7,436,083 | B2 | * | 10/2008 | Shibata et al. ................ 290/44 |

(Continued)

FOREIGN PATENT DOCUMENTS

EP    0995904 A2    4/2000

(Continued)

OTHER PUBLICATIONS

Bossanyi E A: "Individual Blade Pitch Control for Load Reduction" Wind Energy, Wiley, Chichester, GB, vol. 6, Oct. 8, 2002, pp. 119-128, XP008031928, ISSN: 1099-1824.

(Continued)

*Primary Examiner*—Nicholas Ponomarenko
*Assistant Examiner*—Pedro J Cuevas
(74) *Attorney, Agent, or Firm*—St. Onge Steward Johnston & Reens LLC

(57) ABSTRACT

The invention relates to a method for reducing fatigue loads in the components of a wind turbine subjected to asymmetrical loading of its rotor, comprising the steps of: repeatedly collecting and storing load data of the rotor, determining a load distribution function for the rotor from said stored data, deriving a plurality of periodic functions from said load distribution function, determining actions for the wind turbine control means for reducing the fatigue load of the wind turbine components from said derived plurality of periodic functions, and implementing of said determined actions on the wind turbine control means. The invention also relates to a control system as well as a wind turbine and wind park.

42 Claims, 9 Drawing Sheets

U.S. PATENT DOCUMENTS

| | | | |
|---|---|---|---|
| 7,436,085 B2 * | 10/2008 | Shibata et al. | 290/55 |
| 7,445,431 B2 * | 11/2008 | Larsen et al. | 416/1 |
| 7,476,985 B2 * | 1/2009 | Llorente Gonzalez | 290/44 |
| 2004/0151584 A1 * | 8/2004 | Blakemore | 416/9 |
| 2004/0201220 A1 * | 10/2004 | Andersen et al. | 290/44 |
| 2006/0001268 A1 * | 1/2006 | Moroz | 290/44 |
| 2006/0002791 A1 * | 1/2006 | Moroz | 416/1 |
| 2006/0002792 A1 * | 1/2006 | Moroz et al. | 416/1 |
| 2006/0002797 A1 * | 1/2006 | Moroz et al. | 416/98 |
| 2006/0133937 A1 * | 6/2006 | DeLeonardo et al. | 416/132 B |
| 2006/0140760 A1 * | 6/2006 | Saddoughi et al. | 416/23 |
| 2006/0140761 A1 * | 6/2006 | LeMieux | 416/61 |
| 2006/0145483 A1 * | 7/2006 | Larsen et al. | 290/44 |
| 2007/0025859 A1 * | 2/2007 | Jacobsen | 416/230 |
| 2007/0075546 A1 * | 4/2007 | Avagliano et al. | 290/44 |
| 2007/0164567 A1 * | 7/2007 | Luetze et al. | 290/44 |
| 2007/0212209 A1 * | 9/2007 | Borgen | 415/1 |
| 2008/0084068 A1 * | 4/2008 | Shibata et al. | 290/44 |
| 2008/0136188 A1 * | 6/2008 | Krueger | 290/44 |
| 2008/0260514 A1 * | 10/2008 | Nielsen et al. | 415/4.3 |
| 2009/0039651 A1 * | 2/2009 | Stiesdal | 290/44 |
| 2009/0068018 A1 * | 3/2009 | Corten | 416/223 R |
| 2009/0074574 A1 * | 3/2009 | Godsk et al. | 416/41 |

FOREIGN PATENT DOCUMENTS

| | | |
|---|---|---|
| EP | 1674724 A2 | 6/2006 |
| GB | 2117934 A | 10/1983 |
| WO | 2004074681 A1 | 9/2004 |
| WO | WO 2007104306 A1 * | 9/2007 |

OTHER PUBLICATIONS

Caselitz P et al: "Reduction of Fatigue Loads on Wind Energy Onverters by Advanced Control Methods" European Wind Energy Conference, Oct. 1997, pp. 555-558, XP008031751.

International Preliminary Report on Patentability, PCT/DK2006/000153, Jul. 21, 2008, 13 pages.

International Search Report, PCT/DK2006/000153, Nov. 14, 2006, 3 pages.

* cited by examiner

METHOD AND CONTROL SYSTEM FOR REDUCING THE FATIGUE LOADS IN THE COMPONENTS OF A WIND TURBINE SUBJECTED TO ASYMMETRICAL LOADING OF THE ROTOR PLANE

CROSS-REFERENCE TO RELATED APPLICATIONS

The present application is a continuation of pending International patent application PCT/DK2006/000153, filed Mar. 16, 2006, which designates the United States, the content of which is incorporated herein by reference.

FIELD OF THE INVENTION

The present invention relates to a method for reducing fatigue loads in the components of a wind turbine, a control system for reducing the fatigue loads in the components of the wind turbine subjected to asymmetrical loading of the rotor plane, a wind turbine and a wind park.

BACKGROUND OF THE INVENTION

Wind turbine controllers have been deployed in wind turbines for years with the purpose of controlling the overall power output.

The power output from a modern wind turbine can be controlled by means of a control system for regulating the pitch angle of the rotor blades. The rotor rotation speed and power output of the wind turbine can hereby be initially controlled e.g. before a transfer to a utility grid through power converting means. An advantage of this control is a protection of the rotor from rotating at an excessive speed at high wind speeds and save the rotor blades from excessive loads.

Especially for large rotor diameters, the distribution of the wind inflow profile can be non-uniform over the area of the rotor, resulting in a non-uniform load to each rotor blade as a function of one full rotation, as well as asymmetrical out of plane loadings for the drive train of the wind turbine. For a free wind inflow situation the wind shear distribution is approximately linear and the said load as a function of rotation is of nearly sinusoidal behavior with a frequency equal to the rotor rotation frequency. In order to keep a more constant load on the rotor blades, pitch control functions have been applied to wind turbine pitch controllers, where a rotor-cyclic correction with a frequency equal to the rotor rotation has been added to the overall pitch angle setting of the individual rotor blades.

Any obstacles within certain up wind distance of a wind turbine create a wake for the wind turbine and consequently eliminate the free wind inflow situation. An example of an obstacle may be other wind turbines, as a wind turbine always cast a wake in the downwind direction.

Especially in wind parks this fact may significantly influence the inflow on wind turbines situated in the down wind direction. This results in a more complex wind shear distribution than compared to a free wind inflow situation. The said complex wind distribution profile can result in wind turbulence and in turn fluctuating fatigue loads on the wind turbine components. So in order to avoid too much wind turbulence around the turbines, downstream wind turbines are spaced relative far apart resulting in very area consuming wind parks.

It is therefore an object of the present invention to provide a method and a technique that allows an improved wind turbine control strategy in relation to more complex wind shear distribution.

SUMMARY OF THE INVENTION

The invention provides a method for reducing fatigue loads in the components of a wind turbine subjected to asymmetrical loading of its rotor, comprising the steps of:

repeatedly collecting and storing load data of the rotor, determining a load distribution function for the rotor from said stored data, deriving a plurality of periodic functions from said load distribution function, determining actions for the wind turbine control means for reducing the fatigue load of the wind turbine components from said derived plurality of periodic functions, and implementing of said determined actions on the wind turbine control means.

Hereby it is possible to reduce the fluctuating loads on the wind turbine components which facilitate less mechanical wear and tear on the most load-exposed parts of the wind turbine which in turn results in less required service, fewer break-downs and a prolonged life-span for the wind turbine. Alternatively it is hereby possible to increase the power capture of the wind turbine and maintain a low load on the rotor or combinations hereof.

In an aspect of the invention, said derived plurality of periodic functions is sinusoidal and/or cosinusoidal functions. By using derived sinusoidal and/or cosinusoidal functions, it is possible to approximate a pitch correction in close proximity of the desired.

In another aspect of the invention, the frequencies of said plurality of periodic functions is limited series of different integer multiples of the rotor frequency e.g. up to four times the rotor frequency such as any of first, second, third and fourth multiply of the rotor frequency or combinations of at least two of said multiplies. By using limited series of periodic functions it is possible to quickly establish a pitch correction in close proximity of the desired, without requiring significant computational power.

In another aspect of the invention, at least an amplitude component and a phase component are determined for each of said derived periodic functions. Determining said amplitude and phase components facilitates the overall data processing in the computing means and facilitates the link in time and azimuth location between the asymmetrical rotor load and the corrective pitch action.

In another aspect of the invention, said plurality of periodic functions includes at least one function with a frequency equal to the rotor frequency. By including periodic functions with a frequency equal to rotor frequency, it is possible to approximate a pitch correction close to the desired, simplified in a free or near free wind inflow situation.

In another aspect of the invention, said plurality of periodic functions includes at least one function with a frequency equal to four times the rotor frequency. By including periodic functions with a frequency equal to four times the rotor frequency, it is possible to approximate a pitch correction close to the desired, simplified in a partly or full wake situation.

In another aspect of the invention, said plurality of periodic functions are derived by means of a Discrete Fourier Transform applied to the load distribution function. By using Discrete Fourier Transformation to derive said plurality of periodic functions, it possible to use well known, fast and liable programming techniques to implement the program code on the computing means.

In another aspect of the invention, said plurality of periodic functions are derived by means of inverse relations between first periodic harmonic and measured blade modal amplitudes.

In another aspect of the invention, said plurality of periodic functions are derived by means of successive band-pass filtering applied to the load distribution function.

In another aspect of the invention, said plurality of periodic functions are derived by means of a Recursive Least Square estimator applied to the load distribution function.

In another aspect of the invention, said load data are collected by measuring the blade root bending moments whereby a representative measurement can be obtained preferable with already existing sensor means.

In another aspect of the invention, said bending moments are measured for at least one blade. By doing measurements on one blade only, data can be used to establish a optimized pitch correction applied to all blades, assuming that all rotor blades undergoes the same asymmetrical load as a function of one full rotor turn.

In another aspect of the invention, said bending moments art measured for more than one blade e.g. two blades of the wind turbine. By doing measurements on more than one blade, optimal individual pitch correction can be applied to each individual blade.

In another aspect of the invention, said bending moments are measured in two substantially perpendicular directions.

In another aspect of the invention, said load data are collected by measuring the angle of attack for the blades whereby a representative measurement can be obtained preferable with existing measuring means.

In another aspect of the invention, said load data are collected by measuring the forces on a wind turbine main shaft such as a low or high speed shaft.

In another aspect of the invention, said load forces on said shaft are measured in two substantially perpendicular directions.

In another aspect of the invention, said wind turbine control means comprises a blade pitch control mechanism in order to be able to implement said determined actions.

In another aspect of the invention, said load forces are measured continuous or for a predetermined period of time, depending on the degree and speed of variations in the wind inflow situation and on the necessity for measurement and control.

In another aspect of the invention, said predetermined period of time equals 0.01 to 0.5 full rotations of the rotor, preferably in the range from 0.1 to 0.3 full rotations of the rotor depending on necessity here for.

In another aspect of the invention, said predetermined period of time equals 0.5 to 6 full rotations of the rotor, preferably in the range from 0.75 to 3 full rotations of the rotor depending on necessity here for.

The invention also relates to a control system as well as a wind turbine and wind park.

BRIEF DESCRIPTION OF THE DRAWINGS

The invention will be described in the following with reference to the figures in which.

DETAILED DESCRIPTION OF THE INVENTION

Figure 1:
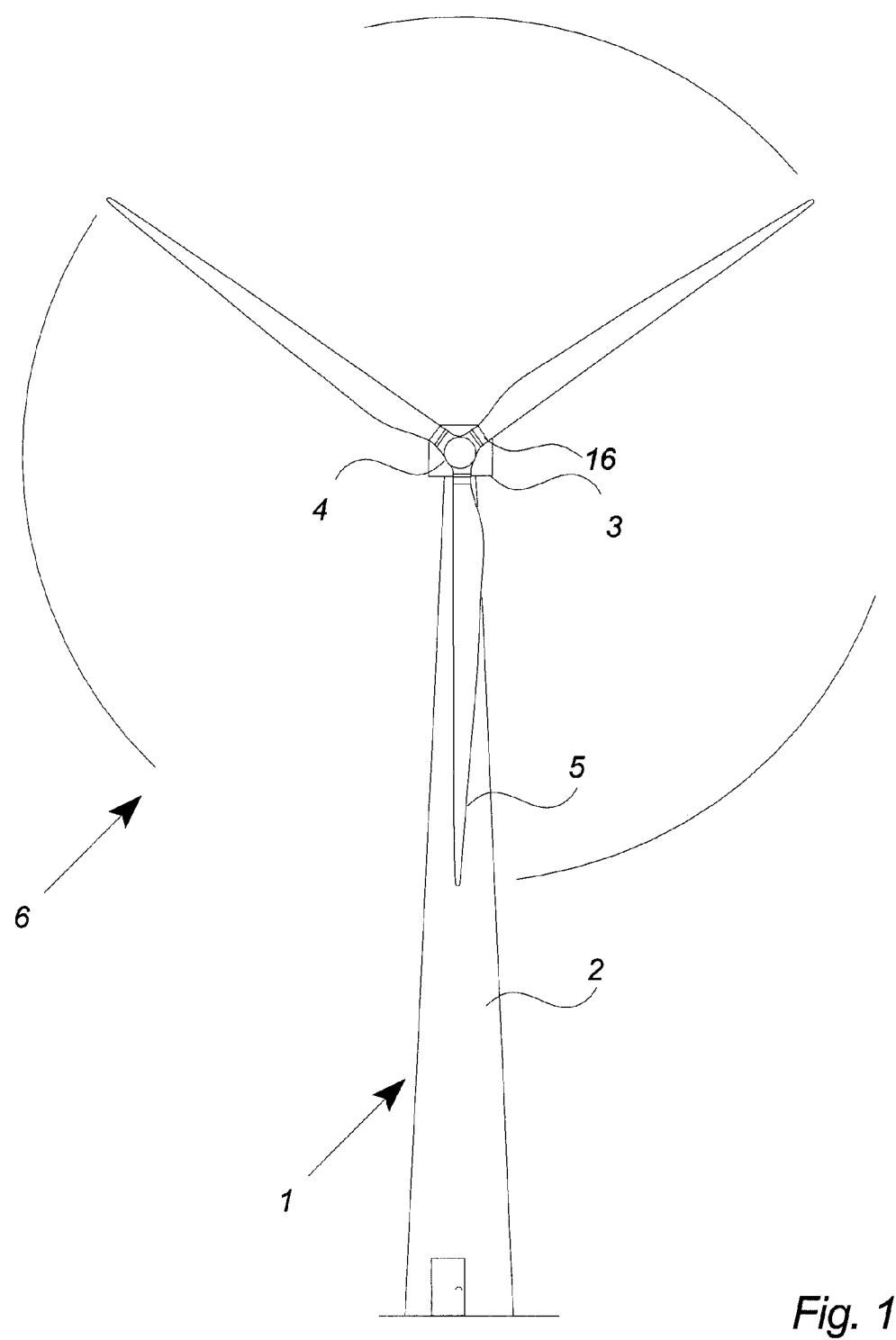
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 16. Each pitch mechanism includes a blade bearing and pitch actuating means which allows the blade to pitch in relation to the wind. The pitch process is controlled by a pitch controller as will be further explained below.

The blades 5 of the wind turbine rotor are connected to the nacelle through the low speed shaft 4 which extends out of the nacelle front.

As illustrated in the figure, wind over a certain level will activate the rotor and allow it to rotate in a perpendicular direction to the wind. The rotation movement is converted to electric power which usually is supplied to the transmission grid as will be known by skilled persons within the area.

Figure 2:
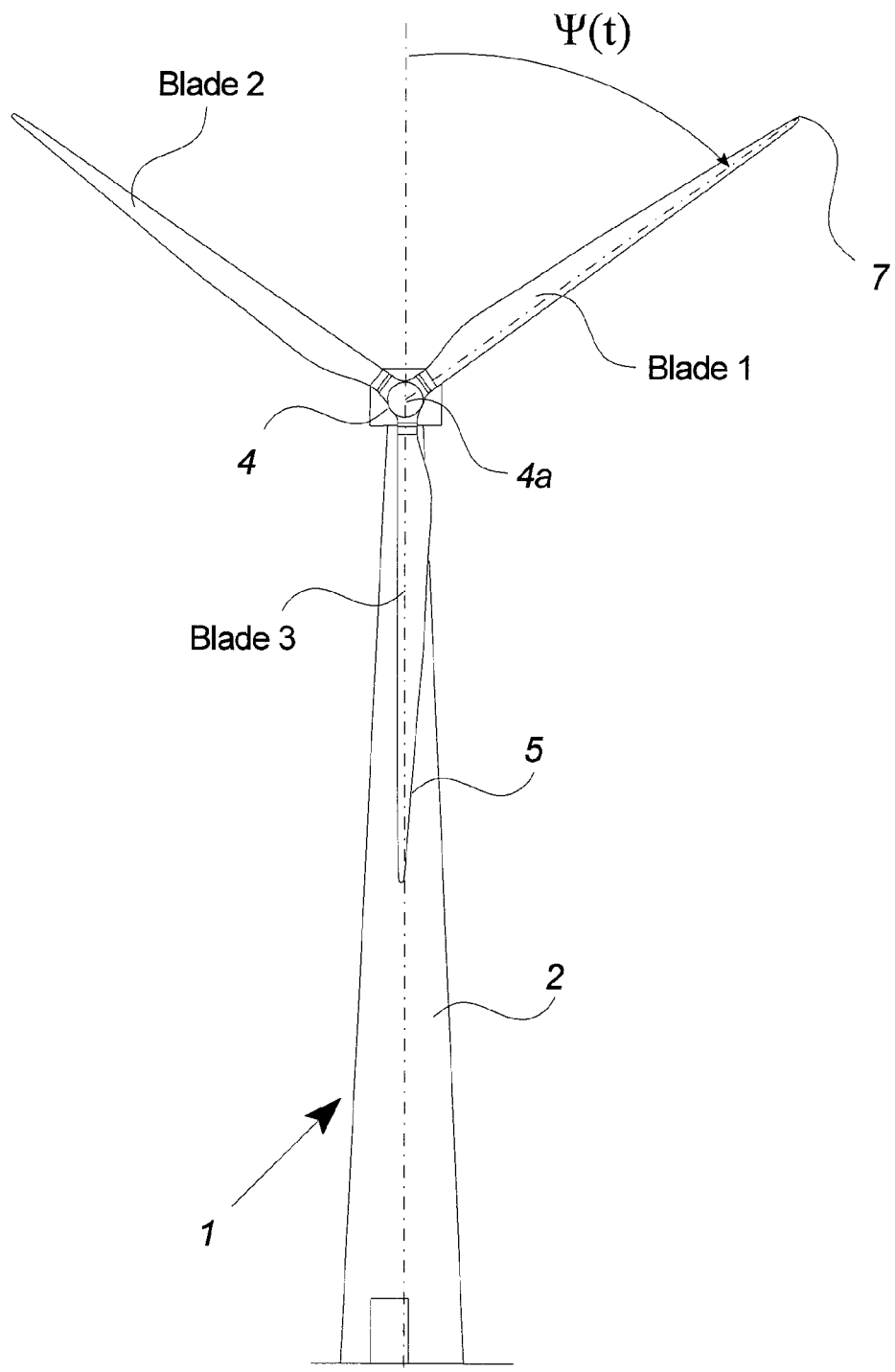
FIG. 2 illustrates a reference system for measuring the Azimuth angle $\psi$. The azimuth $\psi$ is defined by the position of blade 1.

FIG. 2 illustrates how the Azimuth angle $\Psi$ is measured as the angle between a virtual vertical line thru the centre of the low speed shaft 4 and a virtual line defined by the two endpoints: a—the centre of the low speed shaft 4a, and b—the tip point of the rotor blade 7. The Azimuth angle is measured for one reference rotor blade e.g. blade 1 as a function of time and position.

Figure 3A:
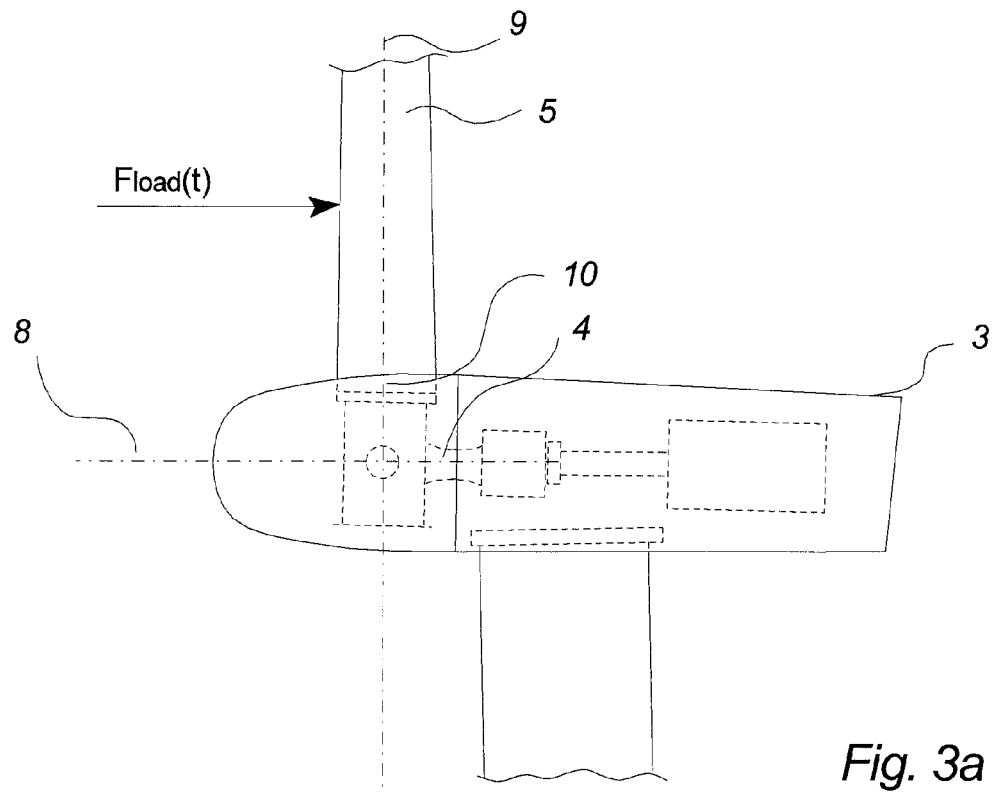
FIG. 3a illustrates schematically an example for direction of wind turbine rotor blade load measurements.

FIG. 3a illustrates one rotor blade 5 of a wind turbine connected to the nacelle 3 trough the low speed shaft 4 which extends out of the nacelle front.

The rotor blade is loaded by a wind force $F_{load}(t)$ dependent of e.g. the wind direction relative to the rotor blade, the area of the rotor blade, the pitch of the rotor blade etc. The said wind force which literally tries to break off the nacelle from the tower or the foundation produces a load bending moment $m_x$ in the low speed shaft 4 and in the root of rotor blade 10 around its centerline 8.

Figure 3B:
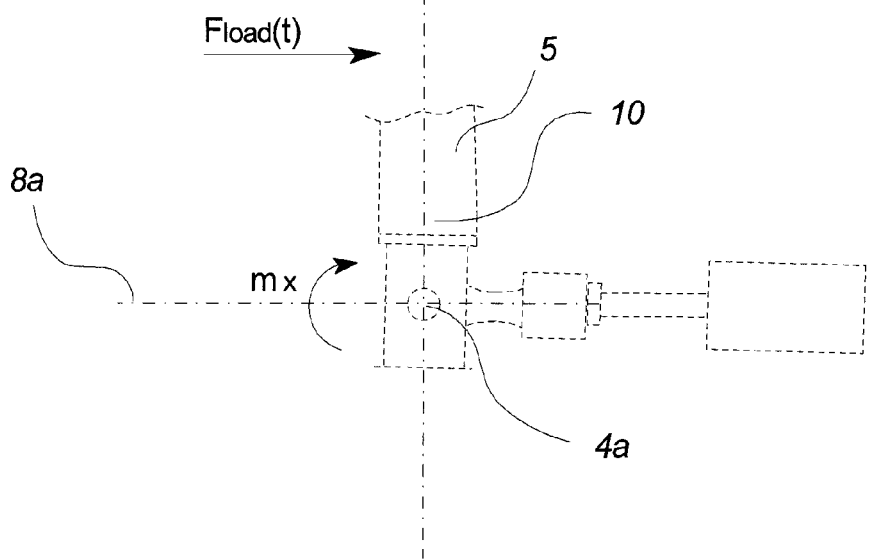
FIG. 3b illustrates a coordinate reference system for measuring the wind turbine rotor blade loads.

FIG. 3b illustrates a formalized diagram of the in situ forces acting on one rotor blade illustrates the center point of the low speed shaft 4a, the horizontal centerline of the low speed shaft 8a, the vertical centerline of the rotor blade through the center point of the low speed shaft 9, a summarized wind force $F_{load}(t)$ and the direction of the load bending moment (or out of plane moment) $m_x$ of blade number x.

Figure 4:
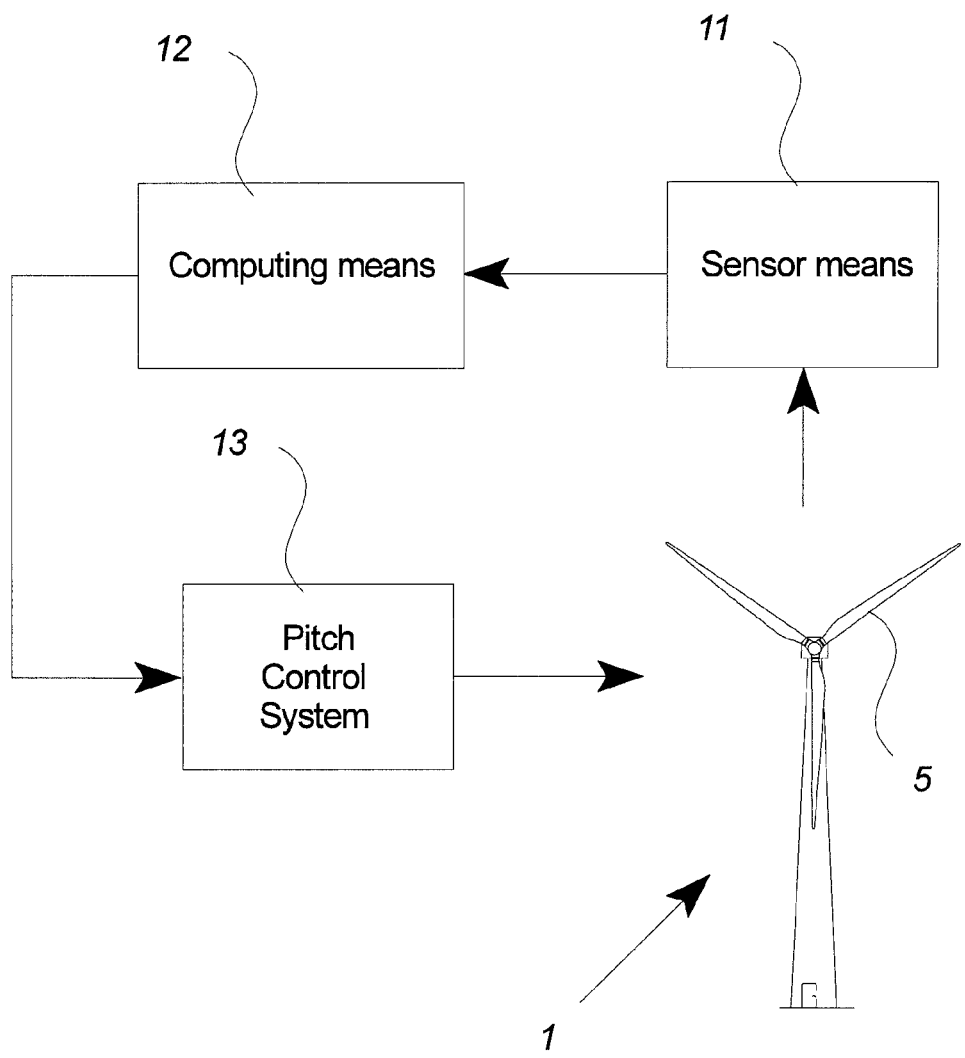
FIG. 4 illustrates schematically an embodiment of a control system for controlling the pitch angles of the wind turbine blades.

FIG. 4 illustrates schematically a preferred embodiment of a control system for controlling the pitch angles of the wind turbine blades Data of the wind turbine 1 are measured with sensor means 11 such as pitch position sensors, blade load sensors, azimuth sensors etc. The measured sensor data are supplied to computing means 12 in order to convert the data to a feedback signal. The feedback signal is used in the pitch control system 13 for controlling the pitch angle by establishing control values for controlling said at least one wind turbine blade 5.

The computing means 12 preferably includes a microprocessor and computer storage means for continuous control of the said feedback signal.

By continuously measuring the present load moments values on the rotor-blades, calculating an desired optimal pitch angle setting and feeding this information to the pitch control system in a closed feedback loop it is possible to optimize the control values to (substantially) to control the rotor at the design limits of the wind turbine and especially the design limits of the wind turbine blades.

An example of prior art for controlling out of plane moment loads on wind turbine blades of a wind turbine is here described.

The blade root loads $M_R = [m_1 \; m_2 \; m_3]^T$ on the rotor blades of a 3 bladed wind turbine are defined as a result of a given linear wind shear distribution between a rotor blade top position ($\psi = 0$) and down-ward position ($\psi = \pi$) corresponding closely to an idealized free wind inflow situation.

Figure 5A:
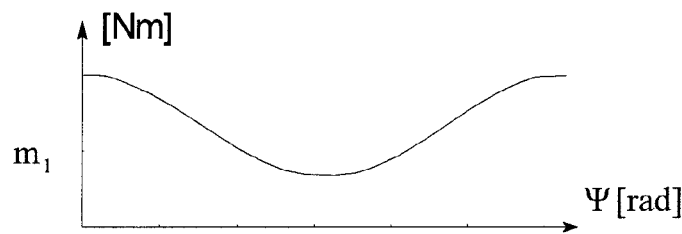
FIG. 5a illustrates the out of plane moment loads on the rotor blades of a 3 bladed wind turbine as a result of an idealized linear wind shear distribution between a rotor blade top position ($\psi$=0 [rad]) and down-ward position ($\psi$=$\pi$ [rad]) corresponding to a free wind inflow situation.
Figure 5A:
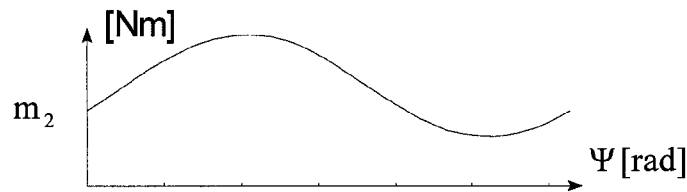
Figure 5A:
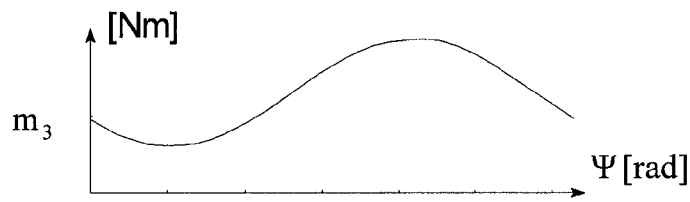

FIG. 5a illustrates a typical picture of said moments for free inflow conditions.

Transforming $M_R$ into a coordinate system defined by the tilt, yaw and thrust equivalent directions, the respective moments loads $m_{tilt}, m_{yaw}, m_{sum}$ become:

$$m_{tilt} = m_1 \cdot \cos(\Psi) + m_2 \cdot \cos\left(\Psi + \frac{4}{3}\pi\right) + m_3 \cdot \cos\left(\Psi + \frac{2}{3}\pi\right)$$

$$m_{yaw} = -m_1 \cdot \sin(\Psi) - m_2 \cdot \sin\left(\Psi + \frac{4}{3}\pi\right) - m_3 \cdot \sin\left(\Psi + \frac{2}{3}\pi\right)$$

$$m_{sum} = m_1 + m_2 + m_3$$

Figure 5B:
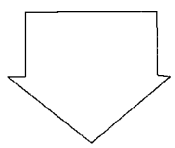
FIG. 5b illustrates the transformed moment loads, $m_{tilt}$, $m_{yaw}$, as a function of azimuth for one full rotor rotation and as a result of the said linear wind shear distribution.
Figure 5B:
Figure 5B:

For the loads illustrated in FIG. 5a, the said transformed moment loads, $m_{tilt}, m_{yaw}$, are illustrated in FIG. 5b as a function of one full rotation of the rotor. For this idealized example of a prior art, $m_{tilt}, m_{yaw}$ are constant.

The close to sinusoidal behavior of $M_R$ as illustrated in FIG. 5a will result in fatigue loads on the rotor blades. A technique to partly compensate for these altering loads on the rotor blades can therefore be to individually control the rotor blades during a full rotation of a blade in order to level the distribution of wind forces i.e. a rotor blade is pitched less into the wind at the top than at the bottom of the rotating movement performed by the rotor including the blades.

Due to this close relation between $M_R$ and the desired controlling of the pitch angle, the desired pitch control signal is also a function of the Azimuth angle i.e. a sinusoidal function on a frequency equal to the rotor-rotation frequency. This technique is called cyclic or rotor-cyclic pitch of the wind turbine blades i.e. a cyclic change of the pitch angle during a full rotation of a blade.

When the rotor blade enters a wake it is exposed to a step-like shearing force. This has been confirmed by actual measurements on wind turbines. Still in order to keep a constant load on the rotor blades under this condition, said rotor-cyclic pitch control can be applied resulting in a basic optimization of the load. But as the affected load is of step-like behavior and the said rotor-cyclic pitch control is of sinusoidal behavior there will always occur a non negligible alternating force on the rotor blades.

Figure 6:
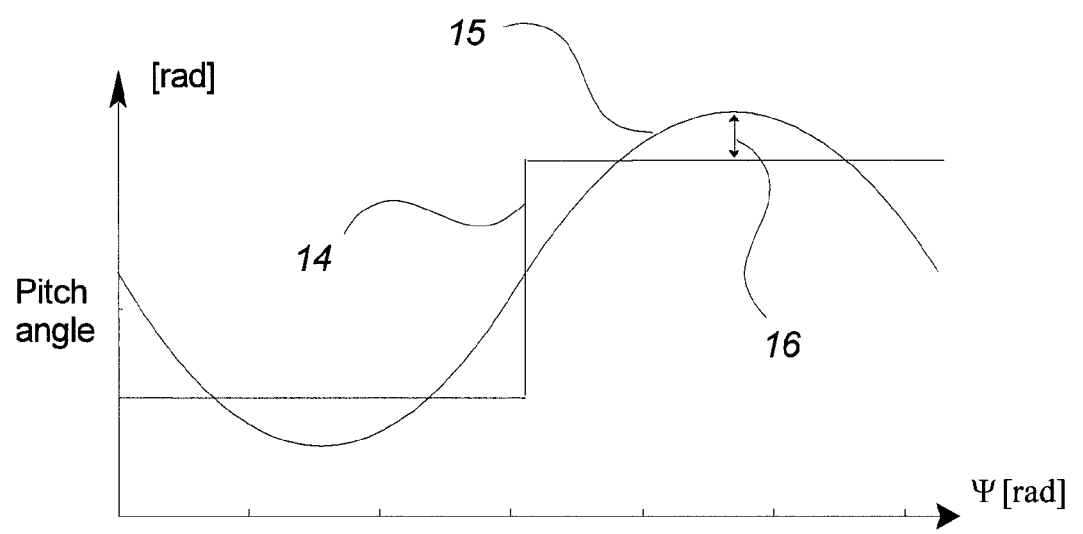
FIG. 6 illustrates the pitch angle error between a desired step function and a rotor-cyclic pitch angle regulation.

This is illustrated in FIG. 6 for said idealized half-wake situation. The curve 14 illustrates a desired abrupt change in pitch angle control and the curve 15 illustrates an actual corrective pitch angle control applied by the said rotor-cyclic pitch technique. Due to the difference between the two curves, an angle error 16 is introduced still resulting in a possibility of increased fatigue loads on the rotor blades.

An example of the present invention for controlling out of plane moment loads on wind turbine blades of a wind turbine is here described.

Figure 7:
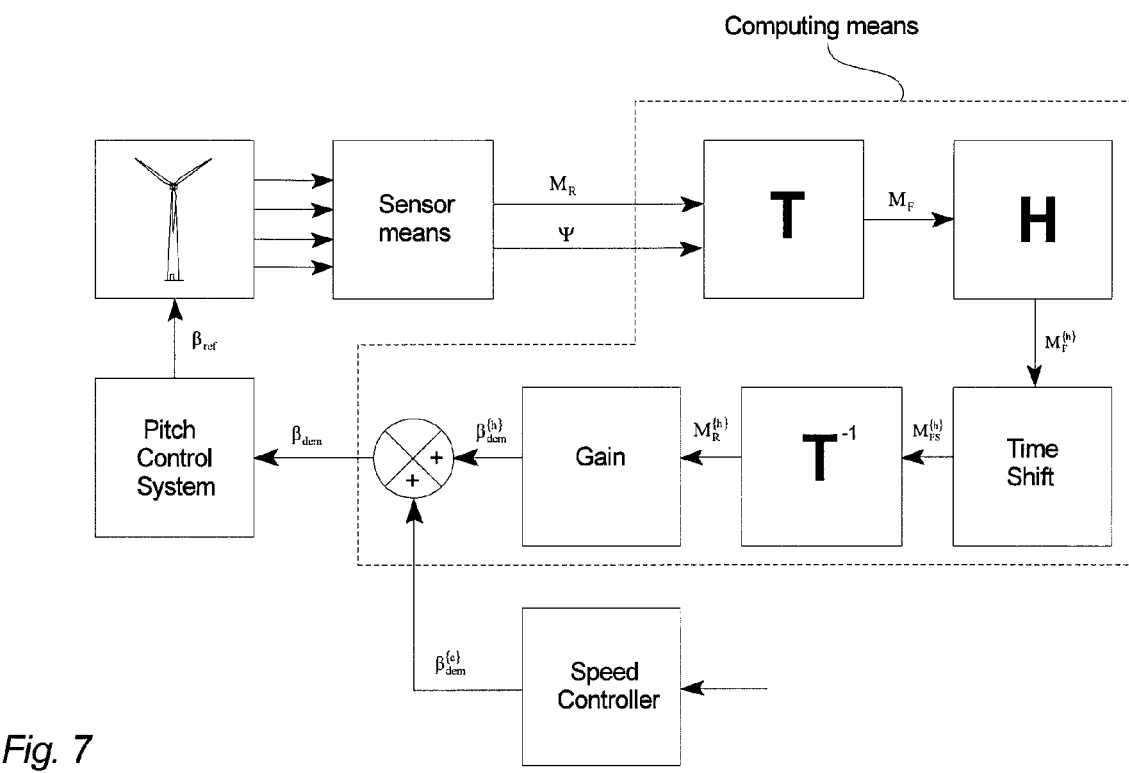
FIG. 7 illustrates schematically the functionality of the invented adaptive pitch system in a pitch controlled wind turbine.

FIG. 7 illustrates for the present invention a preferred embodiment of the said control system for controlling the pitch angles of the wind turbine blades.

The moment loads $M_R = [m_1 \; m_2 \; m_3]^T$ on the rotor blades and the azimuth angle $\psi$ is measured by the sensor means and feed to the computer means.

$M_R$ is transformed into a coordinate system defined by the tilt, yaw and thrust equivalent direction $M_F = [m_{tilt} \; m_{yaw} \; m_{sum}]^T = T \cdot M_R$ Where:

$$T = \begin{bmatrix} \cos(\Psi) & \cos\left(\Psi + \frac{4}{3}\pi\right) & \cos\left(\Psi + \frac{2}{3}\pi\right) \\ -\sin(\Psi) & -\sin\left(\Psi + \frac{4}{3}\pi\right) & -\sin\left(\Psi + \frac{2}{3}\pi\right) \\ 1 & 1 & 1 \end{bmatrix}$$

The inverse relation is given by: $M_R = T^{-1} \cdot M_F$ $M_F$ is data processed by a filter (H) to $M_F^{\{h\}}$, deriving and processing a plurality of harmonic functions on different multiple integers of the rotor frequency ($\omega_{nom}$) in order to adapt the pitch angle control system to minimize the fluctuations on measured load data in such a way, that the loads on the rotor blades are kept constant or nearly constant.

A preferred embodiment of said data processing filter (H) is a Recursive Least Square (RLS) Estimator with exponential forgetting. This is a mathematical optimization technique that attempts to find a best fit to a set of data by attempting to minimize the sum of the squares of deviation between a set of observed data and a set of expected data.

The RLS processing algorithm is based on a few key-operators and can in a computer simulation be implemented after the following algorithm:

$$\varphi(t) = [1 \; \cos(\omega_{nom}t) \; \sin(\omega_{nom}t) \; \cos(2\omega_{nom}t) \; \sin(2\omega_{nom}t)$$
$$\cos(3\omega_{nom}t) \; \sin(3\omega_{nom}t) \; \cos(4\omega_{nom}t) \; \sin(4\omega_{nom}t)]$$

$$\theta = [a_0 \; a_1 \; b_1 \; a_2 \; b_2 \; a_3 \; b_3 \; a_4 \; b_4]^T$$

-continued

```
R = 9 × 9 matrix initialized with zero elements
G = 9 × 1 vector initialized with zero elements
μ = 1/k_o
for p = 1 ... N (p is expressed as simulation step number, 1, 2, 3 ...)
    t = p · T_s
    for i = 1 ... 3    (iteration over m_tilt, m_yaw and m_sum)
        G^(i) = (1 − μ) G^(i) + μ φ(t) M_F^(i)
        R^(i) = (1 − μ) R^(i) + μ φ(t) φ(t)^T
        θ^(i) = (R^(i))^−1 G^(i)
        M_F^{h}(i) = φ(t)^T θ^(i)
End
end
```

In the above computer simulation example:
$\omega_{nom}$=the nominal cyclic rotor frequency
φ=the harmonic analysis vector (here including components up to the $4^{th}$ harmonic)
θ=the harmonic amplitudes
R=is a 9×9 matrix, initialized with zero elements
G=is a 9×1 vector, initialized with zero elements
$T_s$=the simulation step time
μ=a forgetting factor
$k_0$=a positive integer defining the forgetting factor It is worth noting that the said RLS filter is adaptive which yields that the output of the filter changes as a response to a change on the input.

A practical applied version of the data processing comprises computing means for digital data acquisition, harmonic analysis, RLS filter computation, data storage and D/A converting, continuously or for a predetermined period of time.

Due to time-delays in the sensor means, in the computer means and in the pitch control system, the corrective pitch angle control signal is time shifted in relation to the measured blade loads $M_R$. To correct for this, $M_F^{\{h\}}$ is time shifted equivalently to synchronize i.e. $M_{FS}^{\{h\}}=\text{timeshift}(M_F^{\{h\}})$ A general time shift of a sum of harmonic signals can be realized as follows:

$$s(t) = \sum_{i=1}^{n} a_i \cos(\omega_i t) + b_i \sin(\omega_i t)$$

so $$s(t+\tau) = \sum_{i=1}^{n} P^{[i]T} C^{[i]}(t) Q^{[i]}(\tau), \ (1\times 2)\times(2\times 2) = (1\times 1)$$

where:

$$P^{[i]} = [a_i b_i]^T$$

$$C^{[i]}(t) = \begin{bmatrix} \cos(\omega_i t) & -\sin(\omega_i t) \\ \sin(\omega_i t) & \cos(\omega_i t) \end{bmatrix}$$

$$Q^{[i]}(\tau) = [\cos(\omega_i \tau) \ \sin(\omega_i \tau)]^T$$

The filtered and time shifted signal $M_{FS}^{\{h\}}$ is transformed from the fixed reference system back to the rotating reference system by $M_R^{\{h\}}=T^{-1} \cdot M_{FS}^{\{h\}}$.

The signal $M_R^{\{h\}}$ is multiplied with a gain for the conversion to radians i.e. $\beta_{dem}^{\{h\}}=\text{Gain}M_R^{\{h\}}$ and is added to the collective pitch demand signal $\beta_{dem}^{\{c\}}$.

Figure 8A:
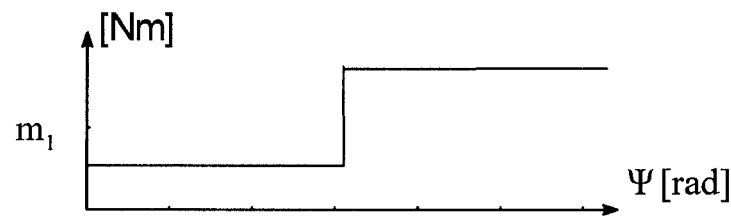
FIG. 8a illustrates the out of plane moment loads on the rotor blades of a 3 bladed wind turbine as a result of a horizontal step shear corresponding to an idealized half wake inflow situation.
Figure 8A:
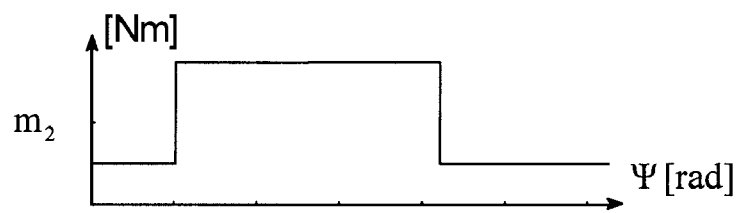
Figure 8A:
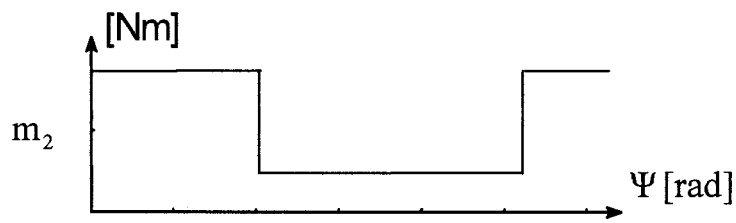

FIG. 8a illustrates as an example moment loads $M_R=[m_1 \ m_2 \ m_3]^T$ on the rotor blades of a 3 bladed wind turbine as a result of a horizontal step shear corresponding to an idealized half wake inflow situation.

Transforming $M_R$ into a coordinate system defined by the tilt, yaw and thrust equivalent direction, the respective moments loads $m_{tilt}$, $m_{yaw}$, $m_{sum}$ become:

$$m_{tilt} = m_1 \cdot \cos(\Psi) + m_2 \cdot \cos\left(\Psi + \frac{4}{3}\pi\right) + m_3 \cdot \cos\left(\Psi + \frac{2}{3}\pi\right)$$

$$m_{yaw} = -m_1 \cdot \sin(\Psi) - m_2 \cdot \sin\left(\Psi + \frac{4}{3}\pi\right) - m_3 \cdot \sin\left(\Psi + \frac{2}{3}\pi\right)$$

$$m_{sum} = m_1 + m_2 + m_3$$

Figure 8B:
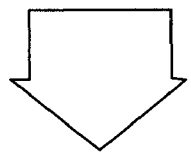
FIG. 8b illustrates the transformed moment loads, $m_{tilt}$, $m_{yaw}$, as a function of azimuth for one full rotor rotation and as a result of the said horizontal step shear.
Figure 8B:
Figure 8B:
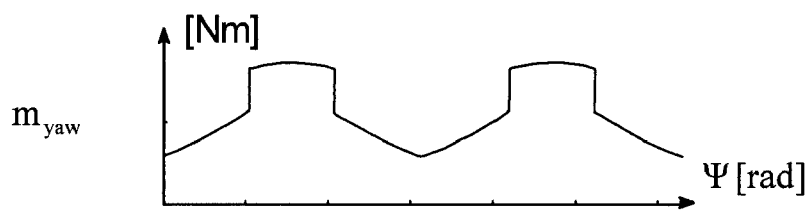

$m_{tilt}$, $m_{yaw}$, are illustrated in FIG. 8b as a function of one full rotation of the rotor.

Periodic functions like the functions illustrated in FIG. 8b can be resolved as an infinite sum of sines and cosines called a Fourier series and can in this case generally be expressed as:

$$m(\Psi) = \frac{a_0}{2} + a_1\cos(\Psi) + b_1\sin(\Psi) + a_2\cos(2\Psi) + b_2\sin(2\Psi) + a_3\cos(3\Psi) + b_3\sin(3\Psi) \ldots$$

where:

$$a_i = \frac{1}{\pi}\int_0^{2\pi} m(\Psi)\cos(i\Psi)d\Psi$$

$$b_i = \frac{1}{\pi}\int_0^{2\pi} m(\Psi)\sin(i\Psi)d\Psi \ \text{for } i = 0, 1, 2, 3, \ldots$$

The computation of Fourier series is known as Harmonic Analysis.

It is seen from the equation of m(Ψ) that the Fourier series consists of a non-alternating component, components that alternate according to the basic parameter Ψ and a plurality of periodic functions of different integer multiples of the basic frequency. The weighted Fourier coefficients $a_i$, $b_i$ determine the amplitude of each harmonic frequency in the original signal.

The said RLS estimator data processes a truncated number of periodic functions derived by the harmonic analysis e.g. the first four multiple harmonics of the basic rotor frequency. The purpose of the RLS estimator is to produce an output signal that is feed to the pitch control system in order to minimize the energy in the load signal $M_R$ i.e. to minimize the fluctuating loads on the rotor blades.

Figure 9:
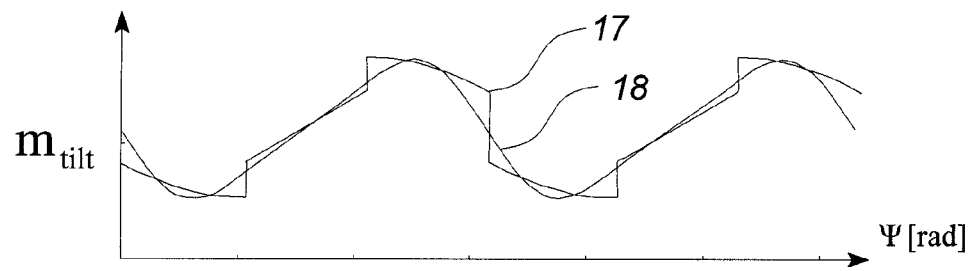
FIG. 9 illustrates the difference between actual transformed moment loads $m_{tilt}$, $m_{yaw}$ and filtered moment loads $m_{tilt}^{\{h\}}$ and $m_{yaw}^{\{h\}}$ as a result of a horizontal step shear corresponding to an idealized half wake inflow situation.
Figure 9:
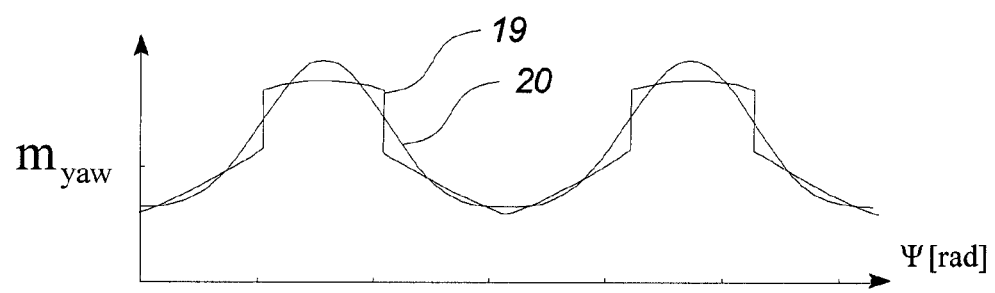

For this idealized example the input signals 17, 19 representing the loads moments $m_{tilt}$ and $m_{yaw}$ of $M_F$ respectively are illustrated in FIG. 9. The output signals $m_{tilt}^{\{h\}}$ and $m_{yaw}^{\{h\}}$ of $M_F^{\{h\}}$ are represented by 18, 20 respectively. The said RLS filter has processed the first four multiple harmonics of the basic frequency.

The filtered signal $M_F^{\{h\}}$ is time shifted to a signal $M_{FS}^{\{h\}}$ and transformed from the fixed reference system back to the rotating reference system by $M_R^{\{h\}}=T^{-1} \cdot M_{FS}^{\{h\}}$ where:

$$T = \begin{bmatrix} \cos(\Psi) & \cos\left(\Psi + \frac{4}{3}\pi\right) & \cos\left(\Psi + \frac{2}{3}\pi\right) \\ -\sin(\Psi) & -\sin\left(\Psi + \frac{4}{3}\pi\right) & -\sin\left(\Psi + \frac{2}{3}\pi\right) \\ 1 & 1 & 1 \end{bmatrix}$$

Finally the filtered signal $M_R^{\{h\}}$ is gain adjusted ($\beta_{dem}^{\{h\}}$) and added to an overall pitch angle control signal $\beta_{dem}^{\{c\}}$ defined by a wind turbine speed controller and the summarized control signal $\beta_{dem}$ is feed to the pitch controller that effectuates the desired actions.

Figure 10:
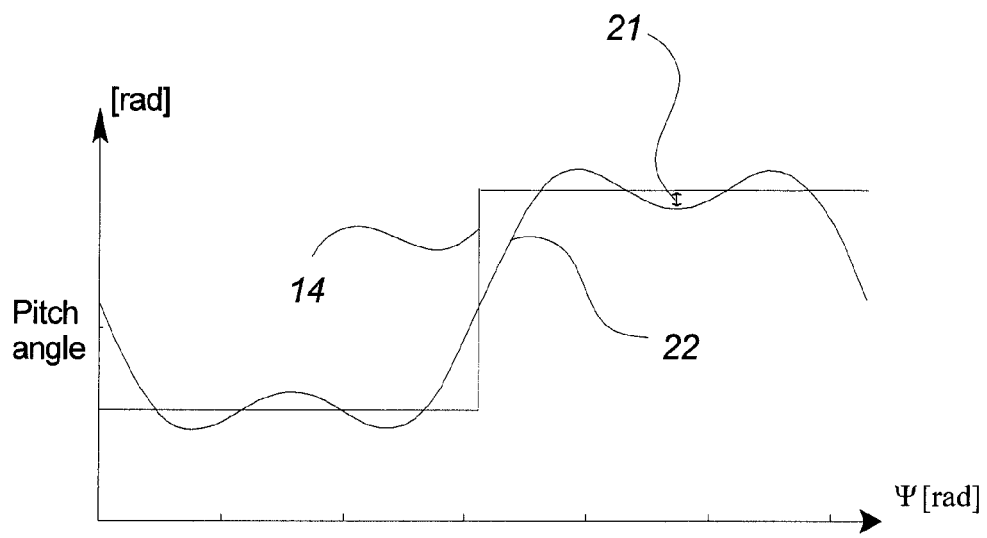
FIG. 10 illustrates the pitch angle error between a desired step function and a harmonic pitch angle regulation, including a truncated number of harmonic components

FIG. 10 illustrates a data processed pitch control signal, e.g. $m_1^{\{h\}}$ of $M_R^{\{h\}}$, from the example above, corresponding to an idealized half-wake situation. The curve 14 illustrates a desired abrupt change in pitch angle control and the curve 22 illustrates an actual corrective pitch angle control applied by the said rotor-cyclic pitch technique. The difference between the two curves is illustrated by 21.

The invention has been exemplified above with reference to specific examples of a wind turbine with a control system for controlling the wind turbine blades by pitch mechanisms. However, it should be understood that the invention is not limited to the particular examples described above but may be designed and altered in a multitude of varieties within the scope of the invention as specified in the claims e.g. in using other formulas and/or measuring data as a supplement.

REFERENCE LIST

In the drawings the following reference numbers refer to:
1. Wind turbine or wind turbine system
2. Wind turbine tower
3. Wind turbine nacelle
4. Low speed shaft
4a. Center point of the low speed shaft
5. Wind turbine rotor blade
6. Wind turbine rotor with at least one blade
7. Tip point of a wind turbine rotor blade
8. Centerline of the low speed shaft
8a. Formalized centerline of the low speed shaft
   Vertical center line of the rotor blade through the center point of the low speed shaft
Root of wind turbine rotor blade'
Sensor means
Computing means
Pitch control system
Example of a desired step pitch angle
Example of an actual rotor-cyclic correction of the pitch angle
Angle error—rotor-cyclic angle correction
Idealized $m_{tilt}$
Filtered $m_{tilt}$
Idealized $m_{yaw}$
Filtered $m_{yaw}$
Angle error—harmonic angle correction
Example of an actual harmonic correction of the pitch angle
ψ. Azimuth angle for rotor blade 1 relative to a fixed vertical reference position

What is claimed is:

1. A method for reducing fatigue loads in the components of a wind turbine subjected to asymmetrical loading of its rotor, comprising the steps of:
   repeatedly collecting and storing load data ($M_R$) of the rotor,
   determining a load distribution function ($M_F$) for the rotor from said stored data,
   deriving and processing a plurality of periodic functions ($M_F^{\{h\}}$) on different multiple integers of the rotor frequency ($w_{nom}$) from said load distribution function,
   determining actions for a wind turbine control means for reducing the fatigue load of the wind turbine components from said derived and processed plurality of periodic functions ($M_F^{\{h\}}$), and
   implementing said determined actions in the wind turbine control means.

2. A method according to claim 1, wherein said derived plurality of periodic functions is sinusoidal and/or cosinusoidal functions.

3. A method according to claim 1, wherein the frequencies of said plurality of periodic functions are different integer multiples of the rotor frequency, e.g. up to 4 times the rotor frequency such as any of first, second, third and fourth multiply of the rotor frequency or combinations of at least two of said multiplies.

4. A method according to claim 1, wherein for each derived periodic function at least an amplitude component and a phase component is determined.

5. A method according to claim 1, wherein said plurality of periodic functions includes at least one function with a frequency equal to the rotor frequency.

6. A method according to claim 1, wherein said plurality of periodic functions includes at least one function with a frequency equal to four times the rotor frequency.

7. A method according to claim 1, wherein said plurality of periodic functions is derived by means of a Discrete Fourier Transform applied to the load distribution function.

8. A method according to claim 1, wherein said plurality of periodic functions are derived by means of inverse relations between first periodic harmonic and measured blade modal amplitudes.

9. A method according to claim 1, wherein said plurality of periodic functions are derived by means of successive band-pass filtering, applied to the load distribution function.

10. A method according to claim 1, wherein said plurality of periodic functions are derived by means of a Recursive Least Square estimator applied to the load distribution function.

11. A method according to claim 1, wherein said load data are collected by measuring the blade root bending moments.

12. A method according to claim 11, wherein said blade root bending moments are measured for at least one blade of the wind turbine.

13. A method according to claim 11, wherein said blade root bending moments are measured on more the one blade e.g. two or three blades of the wind turbine.

14. A method according to claim 1, wherein said root bending moments are measured in two substantially perpendicular directions.

15. A method according to claim 1, wherein said load data are collected by determining the angle of attack for the blades.

16. A method according to claim 1, wherein said load data are collected by measuring the load forces on a wind turbine main shaft such as a low or high speed shaft.

17. A method according to claim 16, wherein said load forces on said shaft are measured in two substantially perpendicular directions.

18. A method according to claim 1, wherein said wind turbine control means comprises a blade pitch mechanism.

19. A method according to claim 1, wherein said load forces are measured continuously or for a predetermined period of time.

20. A method according to claim 1, wherein said predetermined period of time equals 0.01 to 0.5 full rotations of the rotor, preferably in the range from 0.1 to 0.3 full rotations of the rotor.

21. A method according to claim 1, wherein said predetermined period of time equals 0.5 to 6 full rotations of the rotor, preferably in the range from 0.75 to 3 full rotations of the rotor.

22. A control system for reducing the fatigue loads in the components of a wind turbine subjected to asymmetrical loading of its rotor plane comprising:

data collecting and storing means for repeatedly collecting and storing load data ($M_R$) of the rotor, wind turbine control means for controlling the power capture of the wind turbine, and data processing means for processing said collected load data of the rotor of the wind turbine and providing a control output accordingly, where said data processing means being adapted to determine a load distribution ($M_F$) function for the rotor from said stored load data, deriving and processing a plurality of periodic functions ($M_F^{\{h\}}$) on different multiple integers of the rotor frequency ($w_{nom}$) from said load distribution function, determining actions, based on said plurality of periodic functions ($M_F^{\{h\}}$), for said wind turbine control means for reducing fatigue loads on the wind turbine components, and providing a control output accordingly to the wind turbine control means.

23. A control system according to claim 22, comprising means arranged to derive said plurality of periodic functions in form of sinusoidal and/or cosinusoidal functions.

24. A control system according to claim 22, comprising means to collect and store data continuously or for a predetermined period of time.

25. A control system according to claim 1, comprising means to derive from said load distribution function a plurality of periodic functions with frequencies of different integer multiples of the rotor frequency.

26. A control system according to claim 1, comprising means to derive from load distribution function a plurality of periodic functions with frequencies of limit series of different integer multiples of the rotor frequency, e.g. up to 4 times the rotor frequency such as any of first, second, third and fourth multiply of the rotor frequency or combinations of at least two of said multiplies.

27. A control system according to claim 1, comprising means to determine at least an amplitude and a phase component for each of the said periodic functions.

28. A control system according to claim 1, wherein said plurality of periodic functions includes at least one function with a frequency equal to the rotor frequency.

29. A control system according to claim 1, wherein said plurality of periodic functions includes at least one function with a frequency equal to four times the rotor frequency.

30. A control system according to claim 1, where said plurality of periodic functions is derived by means of harmonic analysis applied to said load distribution function.

31. A control system according to claim 1, wherein said predetermined period of time equals 0.01 to 0.5 full rotations of the rotor, preferably in the range from 0.75 to 0.3 full rotations of the rotor.

32. A control system according to claim 1, wherein said predetermined period of time equals 0.5 to 6 full rotations of the rotor, preferably in the range from 0.75 to 3 full rotations of the rotor.

33. A control system according to claim 1, comprising transducer means arranged to measure blade bending moments e.g. near the root of at least one of the blade of the wind turbine and produce an output accordingly to the data collecting means.

34. A control system according to claim 33, wherein said transducer means are arranged to measure blade root bending moments of at least two of the blades of said rotor.

35. A control system according to claim 33, wherein said transducer means are placed in two substantially perpendicular directions.

36. A control system according to claim 1, comprising transducer means arranged to measure the angle of attack for the wind turbine blades and produce an output accordingly to the data collecting means.

37. A control system according to claim 1, comprising transducer means arranged to measure the forces on the wind turbine main shaft.

38. A control system according to claim 35, wherein said transducer means are placed in two substantially perpendicular directions.

39. A control system according to claim 1, wherein said wind turbine control means comprises means for altering the aerodynamic properties of the wind turbine blades e.g. by flaps.

40. A control system according to claim 39, wherein said wind turbine control means comprises a blade pitch mechanism.

41. Wind turbine comprising a control system according to claim 22 for reducing the fatigue loads in the components of the wind turbine subjected to asymmetrical loading of the rotor plane.

42. Wind park comprising at least two wind turbines where at least one wind turbine is controlled with a system according to claim 22 for reducing the fatigue loads in the components of the wind turbine subjected to asymmetrical loading of the rotor plane.

* * * * *